United States Patent [19]

Gardner

[11] 4,353,214

[45] Oct. 12, 1982

[54] ENERGY STORAGE SYSTEM FOR ELECTRIC UTILITY PLANT

[76] Inventor: James H. Gardner, 1616 Arlington Dr., Salt Lake City, Utah 84103

[21] Appl. No.: 963,374

[22] Filed: Nov. 24, 1978

[51] Int. Cl.³ .......................... F01K 25/00; F02C 1/00
[52] U.S. Cl. ........................................ 60/652; 60/649; 60/659; 60/39.52
[58] Field of Search ................. 60/398, 652, 659, 673, 60/649, 39.5, 39.52

[56] References Cited

U.S. PATENT DOCUMENTS 2,942,411 6/1960 Hutchings ............................. 60/659
3,459,953 8/1969 Hughes .............................. 60/652 X Primary Examiner—Allen M. Ostrager
Attorney, Agent, or Firm—Thorpe, North & Western

[57] ABSTRACT

A method for storing excess energy produced by an electric utility during low energy demand periods, utilizing a closed system with a gaseous fluid as the energy storage medium and turbine working fluid. The fluid medium is stored at low pressure in an underground cavern which is located near a commercial electric utility system. During low energy demand periods, electrical output from the utility is channeled to the subject invention for conversion to potential energy, stored in the form of pressurized fluid in a second, high pressure cavern. This fluid transfer is accomplished by a compressor powered by excess electric output of the utility. During peak periods of power demand, a stream of the pressurized fluid is heated and expanded through a turbine/generator combination to generate electrical output. This electrical power is then used to supplement the utility output to meet the higher level of energy requirement arising during peak demand periods. The expanded fluid medium is subsequently returned to the low pressure storage cavern, pending recycle through the closed system. Various embodiments are disclosed illustrating use of excess electric utility output to accomplish the heating and to supply the compression energy to operate the system.

22 Claims, 6 Drawing Figures (PRIOR ART)

ENERGY STORAGE SYSTEM FOR ELECTRIC UTILITY PLANT

BACKGROUND OF THE INVENTION

1. Field of the Invention

This invention relates to compressed air energy storage systems for use with electric utility operations supplying electricity to a community of consumers. More particularly, it relates to a closed system for energy storage utilizing energy produced by one or more electric utilities.

2. Prior Art

The increased urgency of energy conservation has prompted both private and government studies for improving efficiency of current energy systems, as well as developing and commercializing new energy sources. As part of these efforts to improve efficiency in energy production, specific studies have been directed toward the storage of energy produced by electric utility systems during low demand periods, with subsequent regeneration and distribution during pack demand periods for the communities being supplied.

In accordance with this approach, the conventional integrated generating facilities of electric utilities can be designed with a maximum power output which is lower than the peak power demand, based on projected system needs. The difference between this peak demand and the conventional design output of the utility is developed from stored energy which is converted to electrical energy and added to the maximum conventional utility output to reach the total peak demand energy requirement.

This regenerated energy is produced from stored energy produced from the utility operation during low demand periods, when the utility output capacity exceeds the actual demand experienced. Such low demand periods would include nighttime and weekends. Conceptually, this process is represented by a sinusoidal curve (FIG. 1) in which line A—A represents the maximum conventional (base load and integrated peaking) capacity of a given utility or electric plant, and the sinusoidal curve 10 represents consumer demand for energy. During trough periods 11 when consumer demand 10 is below the utility maximum capacity represented by line A—A, excess energy is produced and stored for retrieval at peak demand periods 12.

Several significant conservation factors occur in such a system. First, the capital outlay for construction and operation of the electric utility plant is significantly reduced when the maximum energy output conventional capacity for production of utility is reduced from line A'—A' to line A—A. In addition to this lower capital requirement, a second economy occurs with the more efficient use of equipment involved. For example, instead of the utility plant operating at only ⅓ capacity during low demand periods 11, the utility can operate at the more economical energy production rate occurring at or near full capacity. This factor is particularly significant when the low cost of abundant fuel such as coal is compared with the high cost of equipment and operation associated with a typical utility.

These factors, along with other economical advantages relating to cost efficiencies of production, have encouraged the U.S. Government to assist in the research effort to improve the efficiency of electric utility operations. One such system has been denominated the compressed air energy storage (CAES) system which stores energy in the form of compressed air produced during low demand periods and retrieves such stored energy peak demand periods for distribution to the consumer. The CAES system typically involves the use of large, underground caverns as the compressed air storage site. As typified by the structure in FIG. 2, air is compressed by motor-driven compressors (left of figure) and is stored in the underground reservoir. When supplemental power is required, the stored air together with added hydrocarbon fuel is expanded through a combustion turbine to thereby drive an electric generator.

A primary limitation for the use of CAES systems involves the requirement for very large, underground caverns. Although abandoned mines are extremely suitable, their geographical location may not be in the area of the particular electric utility. Considerable interest is also developing in salt mining technology for possible formation of underground caverns in salt domes or beds throughout the country.

A more detailed discussion of the CAES system, along with additional refinements and engineering improvements are contained in a publication of the U.S. Energy Research and Development Administration, ERDA 76—76, "Economic and Technical Feasibility Study of Compressed Air Storage" (March, 1976), and a followup report entitled, "Conceptual Design for a Pilot/Demonstration Compressed Air Storage Facility Employing a Solution-mined Salt Cavern" EPRI EM-391 (June, 1977). These publications describe actual systems designed for location at McIntosh Salt Dome, Alabama and Huntorf, Germany. Although various improvements directed toward optimizing the CAES system have been reported in these publications, the basic scheme of operation represented by FIG. 2 remains unchanged. Furthermore, the current state of the art of such energy storage systems continues to perpetuate significant disadvantages including (1) consumption of fluid hydrocarbons, resulting in accelerated depletion of natural gas and petroleum reserves, (2) operation at higher costs than base load coal fired or nuclear units, (3) limitation as to selection of working fluid within the CAES system, and (4) pollution of environment by combustion of hydrocarbon fuels as opposed to cleaner fuel systems.

OBJECT AND SUMMARY OF THE INVENTION

It is an object of the present invention, therefore, to provide a method for efficiently storing and retrieving surplus energy produced by one or more electric utility plants.

It is also an object of the present invention to provide a closed system for compressed fluid storage with increased selections for working fluids.

It is an additional object of this invention to utilize electrical output from idle base load capacity of a utility for production of heating fuel to be used in connection with expansion of compressed fluid, or to provide pre-expansion heat for the fluid in other ways, both the compression and fuel production being accomplished with base load energy output from the utility.

It is a further general object of this invention to improve efficient use of capital in utility plant operation and to reduce consumption of natural gas and petroleum fuels used therein.

These and other objects are realized in a closed system method for storing excess energy produced by a utility during low energy demand periods. This is accomplished by utilizing a large, underground cavern for storing a gaseous fluid, to be used as the energy storage medium and working fluid in an expansion turbine. This stored fluid is transferred from the low pressure cavern to a compressor for compression and storage in a high pressure cavern. This storage phase of operation occurs during low energy demand periods in which the utility output exceeds the energy needs of the utility system being supplied. During periods of high energy demand, the stored, pressurized fluid is heated and expanded through a turbine/generator combination to drive the generator and supply the required electrical output. The expanded fluid is returned from the expansion turbine to the low pressure cavern for storage, pending recycle.

Other objects and features will be obvious to a person skilled in the art from the following detailed description, taken with the accompanying drawings.

DETAILED DESCRIPTION OF THE DRAWINGS

FIG. 1 provides a graphic illustration of variable electric power demand on a utility plant.

FIG. 2 discloses a conventional compressed air energy storage system.

DETAILED DESCRIPTION OF THE INVENTION

Referring now to the Drawings

Figure 3:
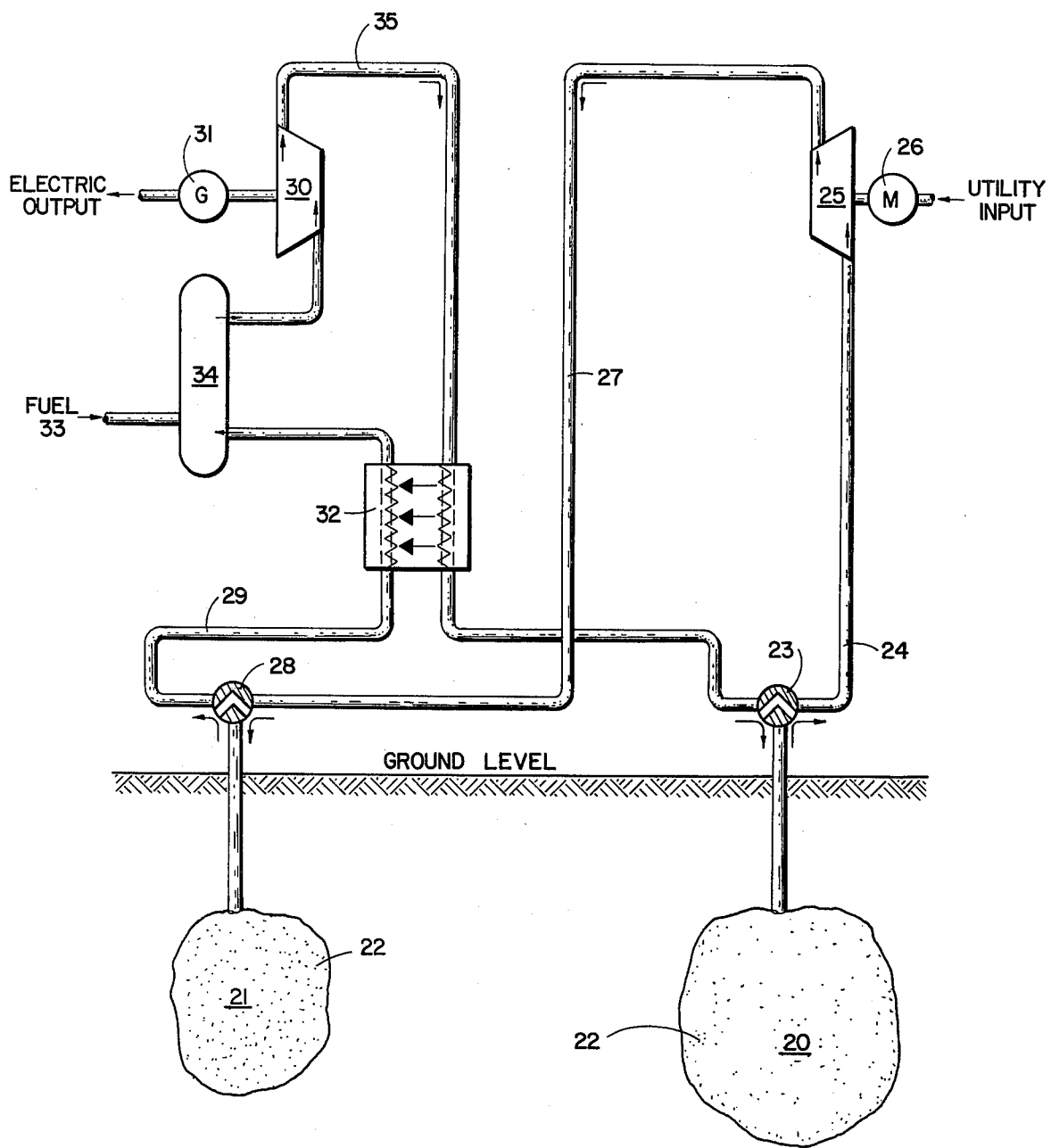
FIG. 3 shows a block diagram of the basic system of the subject invention.

FIG. 3 illustrates the basic system utilized under the subject invention for storing excess power developed by a utility plant, for subsequent retrieval during peak power demand. This system includes a closed-cycle, fluid transfer system in which a gaseous working fluid is cycled between a low pressure cavern 20 and a high pressure cavern 21. Each of these caverns is shown underground because of the large volume capacity required to store sufficient gaseous fluid to provide for economical operation of the system. Actual cavern volumes used will depend on geographical conditions, as well as operational parameters such as pressure levels for high and low pressure storage, and expansion ratios of selected turbines. Ideally, naturally occurring or mined caverns may be adapted for use with the subject invention to thereby avoid capital expenditure for cavern construction. Existing salt mines, for example, range in size from 200 million cubic feet to 1,300 million cubic feet.

Based on CAES design specification outlined in the McIntosh studies previously referenced, a closed cycle system as presently outlined having a 200 MW capacity (equivalent to one large combustion turbine) will have approximate volumes for the high and low pressure cavern systems of 24 million cubic feet and 150 million cubic feet respectively. These values are probably excessive, however, in view of the fact that the subject closed system can effectively operate at a higher level of high pressure storage and/or a lower expansion ratio. Minimum capacities for high and low pressure cavern volumes are approximately one million and ten million cubic feet respectively. Operable pressures for these caverns would be at least 20 atm on the high pressure side and no more than 150 atm on the low pressure side. Practically speaking, all of these parameters will be evaluated in determining optimum values to minimize capital cost per unit of annual peaking energy to be delivered.

As gaseous fluid 22 (also referred to as the primary fluid) is contained within the aforementioned cavern system and operates as the primary energy storage medium and working fluid. This fluid may be any type which permits expansion and compression through a turbine and compressor system. The subject invention is particularly well adapted for use with inert fluids which can be successively compressed and expanded, and which are at the same time capable of safely carrying a fuel substance which must be reacted at the expansion turbine to create a practical power output.

One group of particularly useful working fluids is the rare gases, including helium and argon. Their advantages include favorable thermodynamic properties (particularly high values of $c_p/c_v$) and non-oxidizing character, which allows for the nonexplosive admixture of useful amounts of combustible substances during storage and handling. The latter character also minimizes oxidative attack on turbine buckets and other components at the preferred high operating temperatures.

Carbon dioxide and $N_2$ are each useful as a working fluid, having the same advantages as the rare gases, except that their specific heat ratio is similar to that of air. If the fuel used in the system is a hydrocarbon or carbon monoxide, a carbon dioxide working fluid has the additional advantage of minimizing the number of chemical species involved and hence minimizing gas separation problems.

Reactable gas mixtures (carbon dioxide, carbon monoxide, hydrogen, methane and water) can also be used as working fluids in a closed cycle system in view of their ability to reversibly release and absorb heat when passed over catalysts at high pressure and low pressure respectively. If hydrogen is utilized as the working fluid, it is possible to combine gaseous and liquid storage in systems such as hydrogen, benzene, toluene (or similar aromatic hydrocarbon) and cyclohexane (or analagous hydrogenated product). Alternatively, all-gaseous simple reaction systems can be employed, such as hydrogen, ethylene, ethane, etc.

Figure 1:
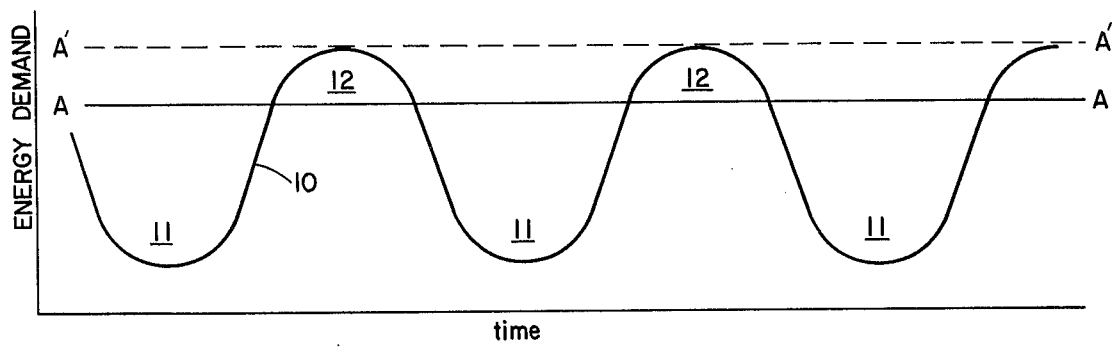

Fluid passage from the low pressure cavern 20 through the closed system begins when valve 23 is opened to communicate with conduit 24 which feeds to a compressor 25. This compressor 25 is driven by a motor 26 or equivalent power means and is actuated by electrical output received from the utility with which the system is associated. The compressed fluid is then fed to a high pressure conduit 27 which is coupled through valve 28 to the high pressure cavern 21. This conversion of electrical energy from the associated utility into potential energy of the compressed fluid occurs during low demand periods such as illustrated in FIG. 1. This trough energy 11 is stored in the high pressure cavern 21 until peak demand periods occur, at which time the potential energy together with heat supplied is converted to electrical energy.

This energy retrieval is effected by releasing the compressed fluid 22 through valve 28 through the high pressure release conduit 29 to the turbine 30 and generator 31 which collectively produce the electrical output used to supplement the utility output during peak demand. To reduce fuel requirement per unit of electrical output, the high pressure release conduit is coupled to a heat transfer element 32 which receives heat from the turbine discharge. More complex heat exchanger systems for fuel savings during the power production cycle are possible and will be obvious to one skilled in the art.

This heated fluid is then mixed and reacted with one or more fuels 33 in a heating chamber 34 preliminary to entering an expansion turbine 30 which drives the generator 31. The fuels 33 may be of any exothermic type such as combustible fuel gases and oxygen, provided the reaction products are separable from the closed system. An example of another form of fuel is a hydrogen/oxygen mixture in molar quantities of 2 to 1 ratio, the reaction of which yields heat and water. Oxygen and methane, CO or mixtures thereof with hydrogen are also acceptable fuels, since they also produce water and carbon dioxide which are easily separable. The expanded fluid from the turbine is returned through the return conduit 35, through valve 23 and into the low pressure cavern 20. This return conduit intercepts the heat transfer element 32 which withdraws heat from the expanded fluid for heating the compressed fluid in the high pressure release conduit 29.

Figure 4:
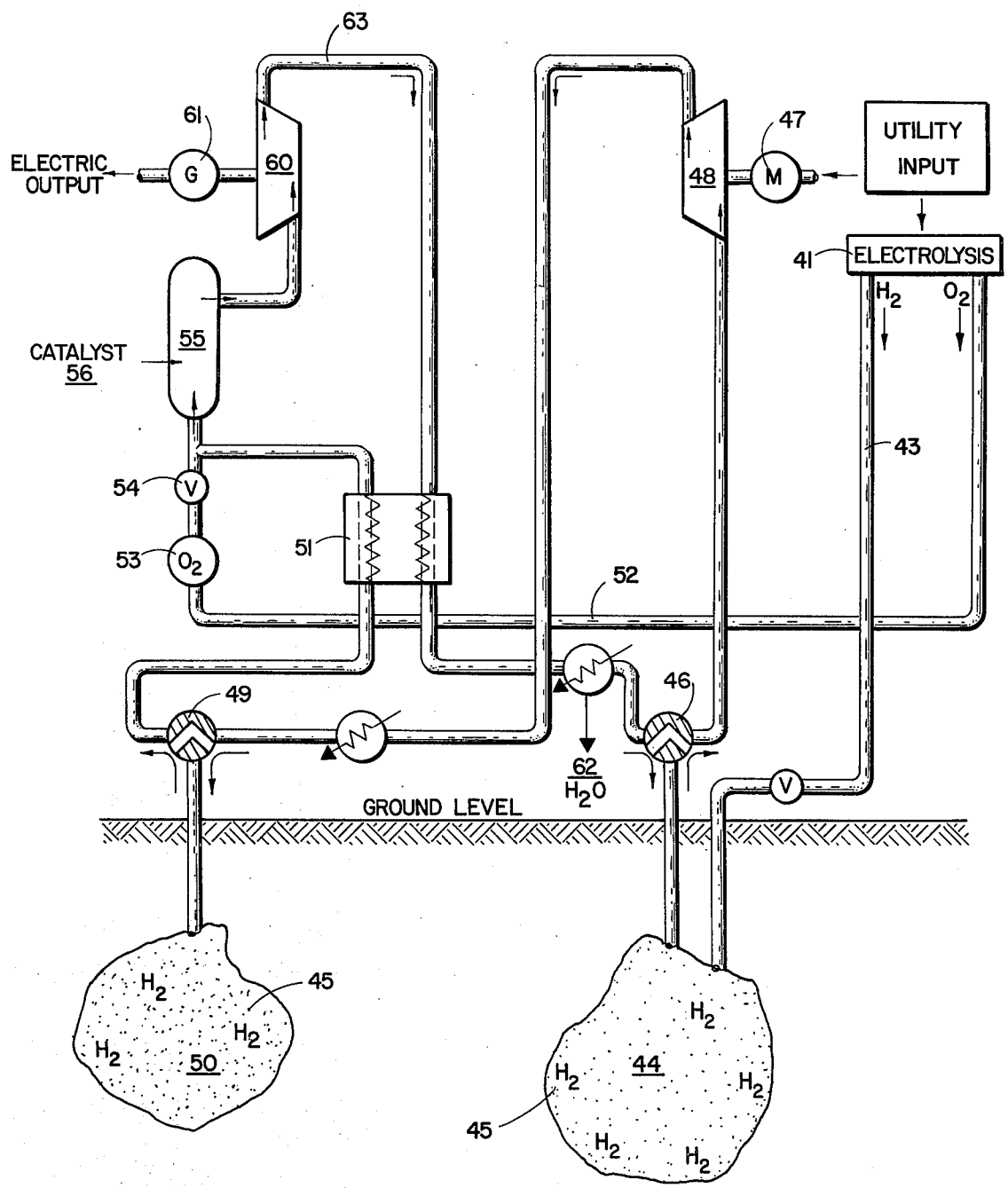
FIG. 4 depicts a block diagram of the subject invention in which an electrolysis system is incorporated for fuel production.

A second embodiment of the subject invention involves the use of trough energy 11 supplied by the electric utility to produce the fuel for heating the fluid as well as compressing the fluid for storage in the high pressure cavern. Such an embodiment is illustrated in FIG. 4 in which hydrogen and oxygen are supplied as fuel by electrolysis. As an illustration of one form of fluid path, the constituents of the electrolysis brine are fed to the electrolysis apparatus 41 where the electrolysis reaction occurs. The resultant hydrogen is conducted through conduit 43 to the low pressure cavern 44, in which the hydrogen diffuses throughout the fluid medium 45. From this point, the hydrogen and fluid medium mixture will be transported through valve 46, compressed under power to the utility output which drives the motor 47 and compressor 48. The fluid is then pumped through valve 49 and into the high pressure storage cavern 50. As with the previous example, the hydrogen and fluid medium are stored in the high pressure cavern until a peak demand period requires that the energy be retrieved for production of electrical output. Valve 49 is then adjusted to feed the hydrogen and fluid medium through a heat transfer element 51 where the mixture is heated in preparation for combination with the oxygen reactant. The concentration of hydrogen in the fluid medium 45 is maintained below the explosive limit of concentration, thereby guaranteeing a high degree of safety of operation.

Oxygen is supplied from the electrolysis apparatus 41 through an oxygen feed line 52 to a storage tank 53. Preferably, the oxygen storage tank 53 includes compressor means to liquify the oxygen for ease in storage. Valve 54 is utilized to control the measure of oxygen metered into the mixing chamber 55. As indicated previously, a stoichiometric connection of two parts hydrogen to one part oxygen is required so that the water formation reaction can be actuated by the catalyst 56.

The working medium is heated to the desired turbine inlet temperature (1200° to 2100° F.) by the exothermic reaction of hydrogen and oxygen to pure water. The turbine 60 and generator 61 combination are driven by expansion of this fluid medium and the water product 62 is separated from the return flow line 63 which leads to the low pressure cavern 44, passing through the heat transfer element 51. The cycle is then ready to be repeated.

A primary advantage of the closed system of the subject invention is the permanent retention of an inert working fluid if desired. Again, the selection of a particular working fluid would depend upon its thermodynamic properties, especially $k=C_p/C_v$, to optimize the economies of turbine and/or compressor operation.

This capability of using inert gas fluids also provides the benefit of reduced reactive wear and tear in the turbine which might otherwise result from salt entrainment and/or oxidation with degradation of exposed metals and alloys. Further economies are developed under the system described in this latter embodiment by the use of energy from the utility operation to produce both the compression of the working fluid and to supply the reactant for the heating phase at the expansion turbine.

Figure 5:
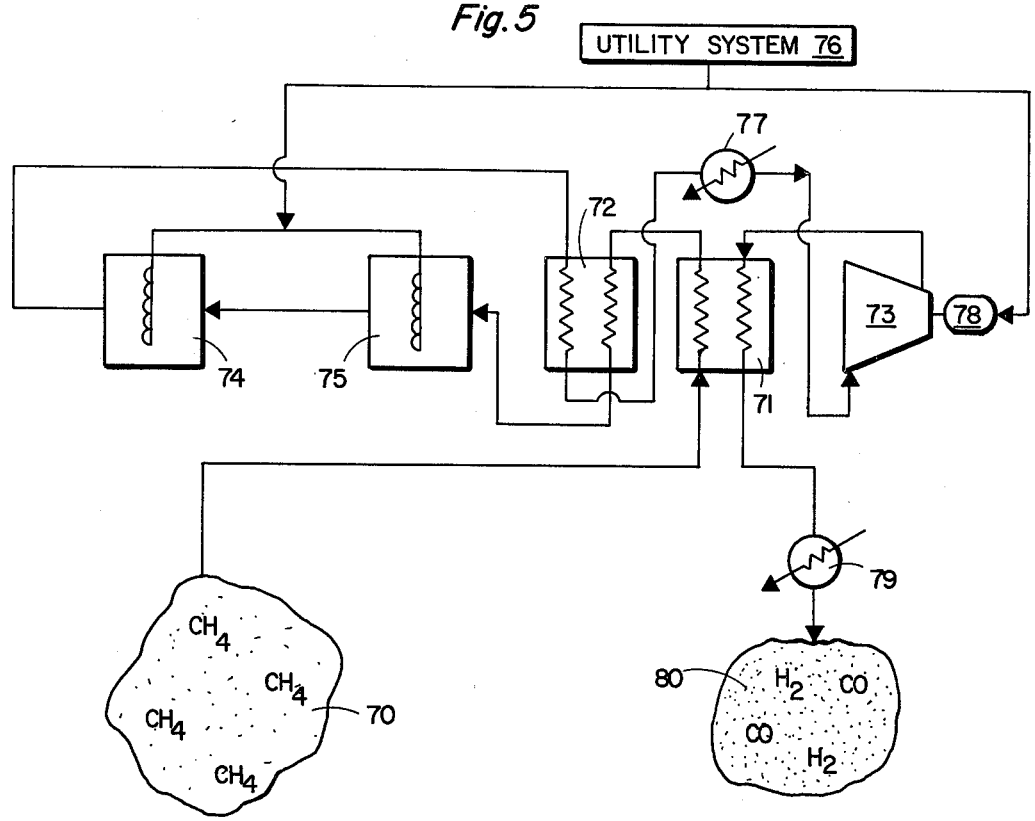
FIG. 5 shows a graphic representation of an additional embodiment of the subject invention, depicting the energy storage phase in which expansion heat is provided by a methanator-reformer reaction system.
Figure 6:
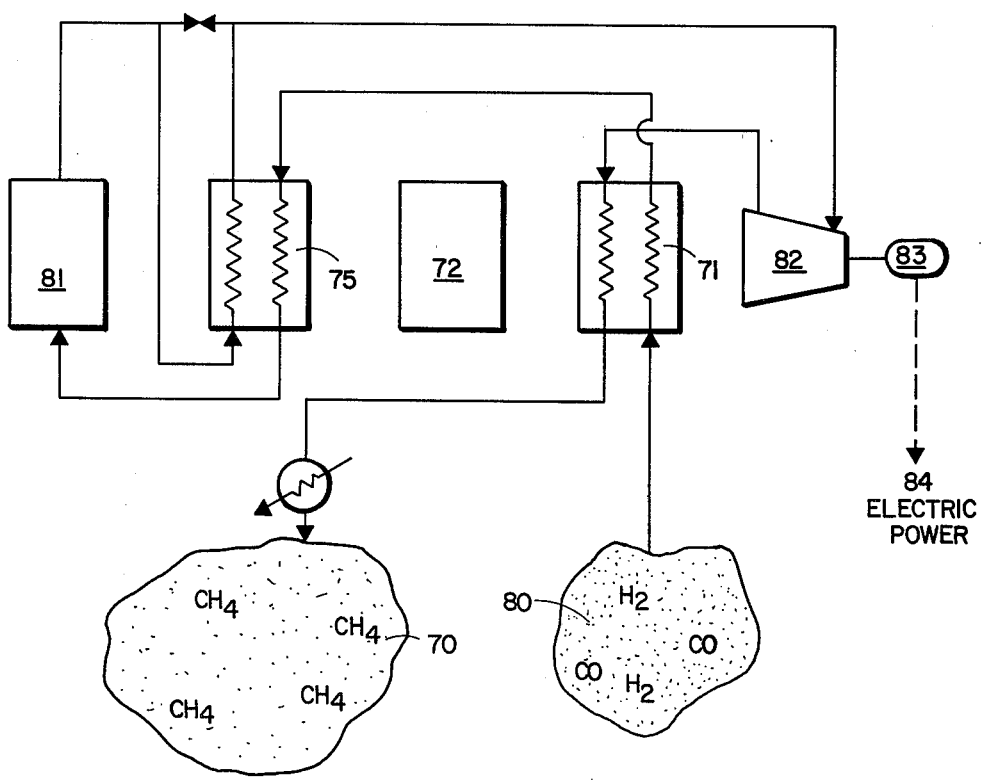
FIG. 6 illustrates the energy recovery phase of the system of FIG. 5.

A third embodiment of the subject invention consists of a reformer-methanator system depicted in FIGS. 5 and 6. These figures figuratively represent the respective reversible reformation and methanation reactions used in this system. During the storage cycle, methane-rich working fluid is transferred from the low pressure cavern 70 through heat exchangers 71 and 72 which draw heat from the heated fluid exiting from a compressor 73 and from the reactor 74. The methane-rich fluid is then conducted through a preheater 75 to raise the fluid to reaction temperature and to provide control for reaction in the reformation reaction chamber 74 as follows:

$$CH_4 + H_2O \xrightarrow{\Delta} CO + 3H_2 \tag{1}$$

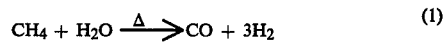

Note that all heat for this reaction is provided by the electrical output of the electric utility system 76 during off-peak periods.

The reaction products CO and H2 are transported through the heat exchanger 72, cooled 77 and compressed by a motor 78 driven compressor 73. After passing through the heat exchanger 71, the H2/CO-rich fluid is cooled 79 for storage in the high pressure cavern 80, pending occurrence of a peak demand period. Again, it should be noted that this conversion of the low pressure $CH_4$ to high pressure CO and $H_2$ is accomplished by use of off-peak power in both the reaction and compression phases of the process, thereby maximizing the energy conservation developed by the subject storage system.

During the power generation cycle, the $CO/H_2$ fluid is released from the high pressure cavern 80, through the heat exchanger 71 to the pre-heater 75 and then to a reactor 81 where the following exothermic reaction occurs:

$$CO + 3H_2 \rightarrow CH_4 + H_2O \tag{2}$$

This reaction is initiated by catalyst to produce the methane desired. This expanded fluid drives a turbine 82 and generator 83 combination to yield the supplemental peak power requirement 84.

Figure 2:
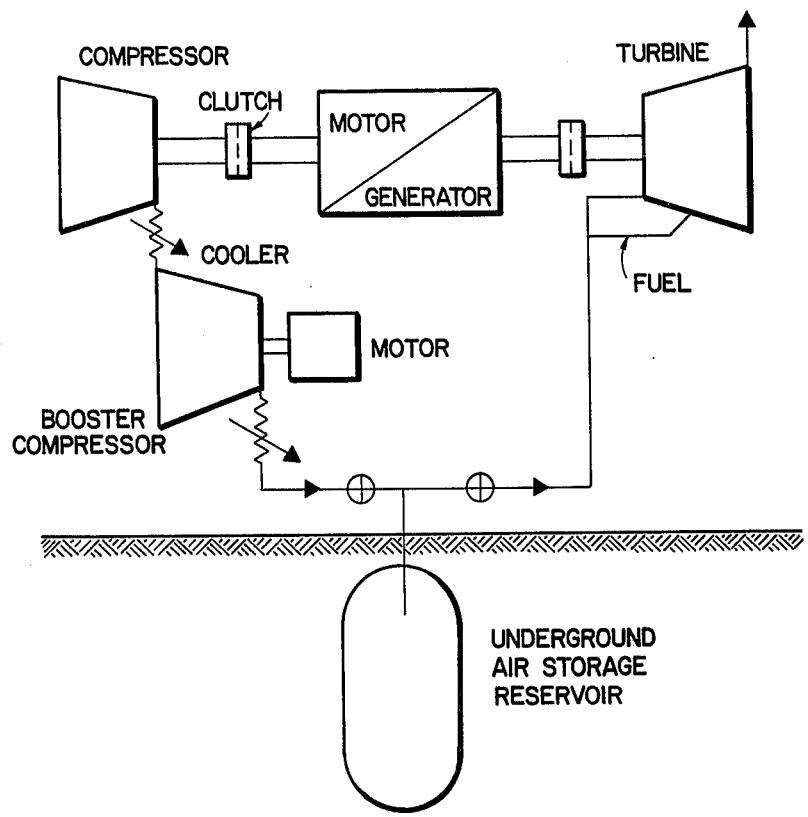

The various illustrated embodiments of the subject invention represent only several of numerous methods of practicing the basic invention involving more effective use of off-peak power. The benefits of relying on unused utility output as opposed to externally purchased fuels include not only economic advantage, but fuel conservation as well. In addition, the closed cycle system facilitates a broad selection of fluid medium adapted for the various types of active reactants to be used in the system. The system is also well adapted for use with a single unit generator/motor combination as disclosed in FIG. 2 with disengagable clutch assemblies to couple the unit to the turbine or compressor, depending on the operation phase. Although these embodiments represent preferred forms of the invention, it is to be understood that the present disclosure is by way of example only, and that variations are possible without departing from the following claimed subject matter.

I claim:

1. A method using a substantially closed fluid system for storing and retrieving excess energy produced during low energy demand periods by an electric utility, comprising the steps of:
   a. storing a gaseous primary fluid at low pressure in a low pressure underground storage cavern,
   b. compressing said primary fluid to high pressures utilizing energy output produced by said utility during low consumer demand periods,
   c. storing said compressed primary fluid in a high pressure underground storage cavern,
   d. transferring said compressed fluid during peak power demand from said high pressure storage cavern to a reaction zone,
   e. reacting an exothermic fuel constituent within said compressed primary fluid to generate a heated working fluid comprised of said primary fluid and any fuel reactants and products present,
   f. expanding said working fluid to produce an electrical output for supplementation of utility capacity, and
   g. returning at least the resulting expanded primary fluid to said low pressure cavern.

2. A method as defined in claim 1, wherein the low pressure of the primary fluid is less than approximately 150 atm.

3. A method as defined in claim 1, wherein the high pressure of the primary fluid is at least approximately 20 atm.

4. A method as defined in claim 1, wherein the low pressure cavern has a volume of at least approximately 10 million cubic feet.

5. A method as defined in claim 1, wherein the high pressure cavern has a volume of at least approximately one million cubic feet.

6. A method as defined in claim 1, wherein the volume ratio of the respective high and low pressure caverns is at least 1:6.

7. A method as defined in claim 1, wherein the respective high and low pressure caverns comprise cavities in underground salt deposits.

8. A method as defined in claim 1, wherein the respective high and low pressure caverns comprise abandoned mines capable of being sealed to develop a substantially closed system.

9. A method as defined in claim 1, wherein said primary fluid includes an inert gas suitable for compression and expansion through the system.

10. A method as defined in claim 9, wherein the inert gas is selected from the group of $N_2$, $CO_2$, $H_2O$ and rare gases including He and Ar.

11. A method as defined in claim 1, wherein said fuel constituent is selected from the group consisting of combustible hydrocarbons, hydrogen and CO.

12. A method as defined in claim 1, wherein said stored, compressed primary fluid includes a liquid phase constituent capable of vaporization and cycling through the closed system.

13. A method as defined in claim 12, wherein the liquid phase constituent is selected from the group consisting of
   a. benzene, toluene or similar aromatic hydrocarbons, and
   b. cyclohexane or similar cyclic aliphatic hydrocarbons.

14. A method as defined in claim 1, wherein said expansion step employs a turbine/generator combination which is driven by the primary fluid.

15. A method as defined in claim 1, further comprising the step of generating said exothermic fuel constituent utilizing excess electrical output of said utility.

16. A method as defined in claim 15, wherein said generating step includes applying electrical output of said utility to an electrolysis device to produce hydrogen and oxygen as said exothermic fuel constituent.

17. A method as defined in claim 16, wherein said $H_2$ is introduced from the electrolysis device directly into said low pressure storage cavern during said low energy demand periods, said $O_2$ being separately stored for subsequent introduction as an exothermic fuel constituent in said reacting step.

18. A method as defined in claim 1, further comprising the step of separating exothermic fuel reaction product from the closed system.

19. A method as defined in claim 15, wherein the exothermic fuel constituent is generated by applying energy from the electrical output of the utility to drive reactants of a reversible chemical reaction to reaction product operable as an exothermic fuel in the reacting step of claim 1, said method including the additional steps of:
   a. introducing the reactants for reversible chemical reaction into the primary fluid prior to said reacting step of claim 1,
   b. applying energy from the electrical output of the utility to cause reaction of the reversible reactants to yield product operable as exothermic fuel constituent in combination with the primary fluid,
   c. compressing said primary fluid and fuel constituent combination to high pressures utilizing energy output produced by said utility during low consumer demand periods,
   d. storing said compressed primary fluid and fuel constituent combination in a high pressure underground storage cavern,
   e. transferring said compressed primary fluid and fuel constituent combination during peak power demand from said high pressure storage cavern to a reaction zone,
   f. reacting the exothermic fuel constituent (including the reversible reaction product of step b above) to form the reactants of the reversible chemical reaction within the compressed primary fluid to thereby generate a heated working fluid comprised of said primary fluid and any fuel reactants and products present, g. expanding said working fluid to produce an electrical output for supplementation of utility capacity, and h. returning at least the resulting expanded primary fluid and reversible reactants to said low pressure cavern.

20. A method as defined in claim 19, wherein said reversible chemical reaction comprises a reformation/methanation reaction $$\frac{CH_4 + H_2O \xrightarrow{\Delta} CO + 3H_2}{CO + 3H_2 \xrightarrow{Catalyst} CH_4 + H_2O}$$

wherein the reactants comprise $CH_4 + H_2O$ and the reaction product includes $CO + H_2$.

21. A method as defined in claim 20, including the following steps:

a. introducing methane into the primary fluid within the low pressure cavern, b. transferring the primary fluid and methane to a heating zone, c. adding $H_2O$ to the methane/primary fluid combination, d. applying energy from the utility electrical output to develop heat in sufficient quantity to raise the temperature of the methane and $H_2O$ sufficient to support the following reaction:

$$CH_4 + H_2O \xrightarrow{\Delta} CO + 3H_2$$

e. compressing the reaction products of the previous step ($CO$ and $H_2$) and transferring such products and primary fluid to the high pressure cavern for storage until use is required during peak energy demand, f. transferring said compressed primary fluid and reaction product during peak power demand from said high pressure storage cavern to a reaction zone, g. catalitically initiating reaction of the reaction product:

$$CO + 3H_2 \rightarrow CH_4 + H_2O$$

to generate a heated working fluid comprised of said primary fluid and any remaining reactants and reaction products from the previous step, h. expanding said working fluid to produce an electrical output for supplementation of utility capacity, and i. returning at least the resulting expanded primary fluid and methane to the low pressure cavern.

22. A method as defined in claim 19 wherein at least one of the reactants of the reversible chemical reaction is the primary fluid.

* * * * *